Figure 10:
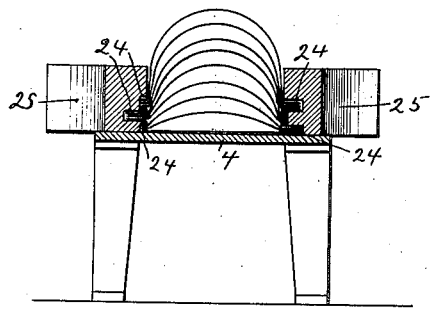

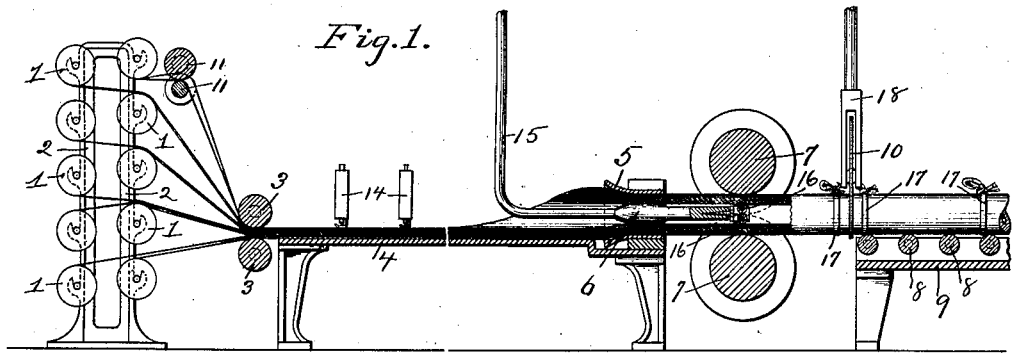

No. 775,537. PATENTED NOV. 22, 1904.
J. A. McCONNELL.
PIPE COVERING AND PROCESS OF MAKING SAME.
APPLICATION FILED AUG. 4, 1900.
NO MODEL. 4 SHEETS—SHEET 2.
*Fig. 6.*
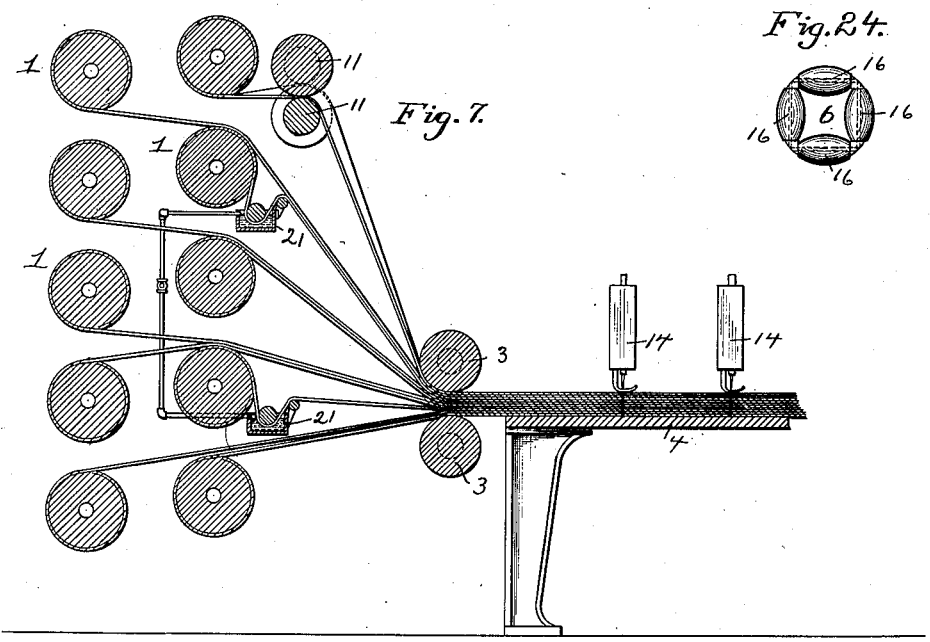
*Fig. 7.*
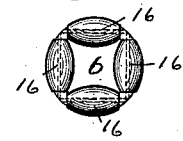
*Fig. 24.*
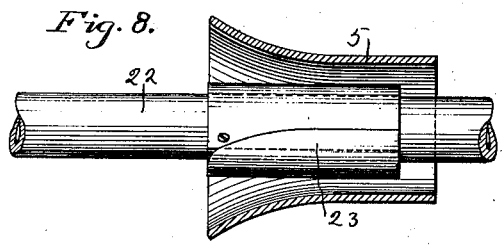
*Fig. 8.*
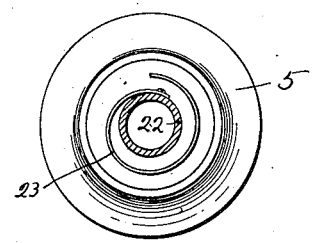
*Fig. 9.*
Witnesses:
Inventor:
John A. McConnell
By Kay & Totten
Attorneys.

No. 775,537. PATENTED NOV. 22, 1904.
J. A. McCONNELL.
PIPE COVERING AND PROCESS OF MAKING SAME.
APPLICATION FILED AUG. 4, 1900.
NO MODEL. 4 SHEETS—SHEET 3.

Witnesses:
Walter Samaniss
Allan W. Foose.

Inventor:
John A. McConnell
By Kay & Totten
Attorneys.

No. 775,537. PATENTED NOV. 22, 1904.
J. A. McCONNELL.
PIPE COVERING AND PROCESS OF MAKING SAME.
APPLICATION FILED AUG. 4, 1900.
NO MODEL. 4 SHEETS—SHEET 4.
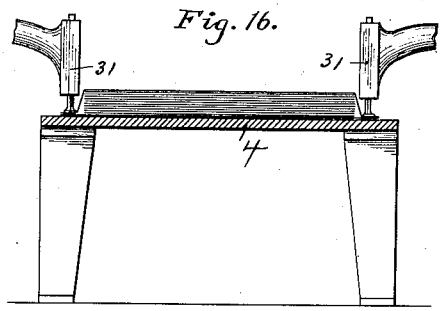
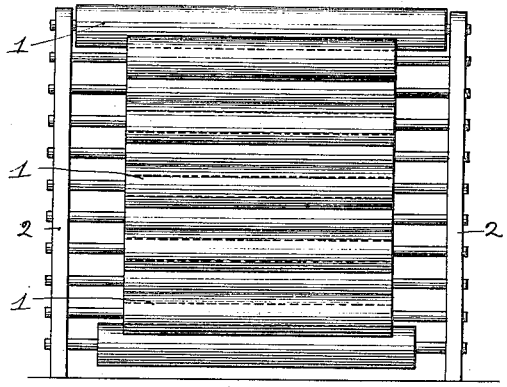
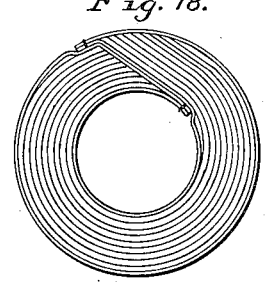
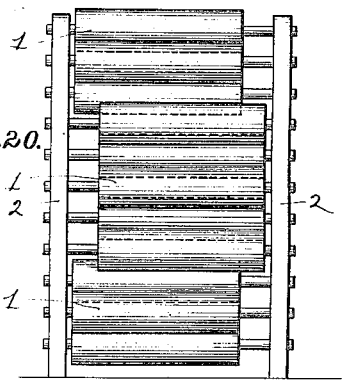
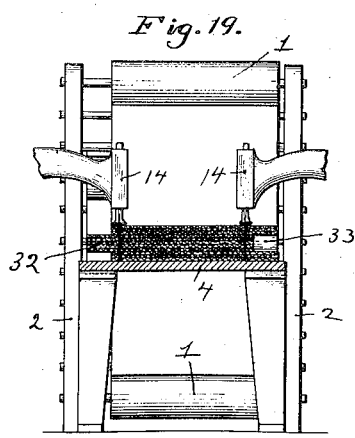
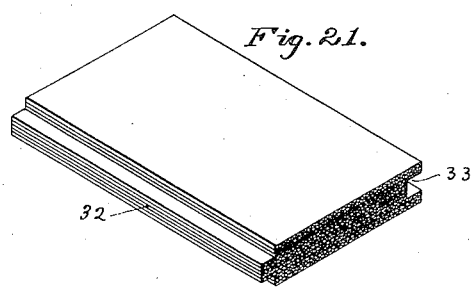
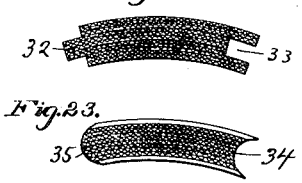
Witnesses:
Inventor:

No. 775,537.

Patented November 22, 1904.

UNITED STATES PATENT OFFICE.

JOHN A. McCONNELL, OF ALLEGHENY, PENNSYLVANIA, ASSIGNOR TO McCONNELL ASBESTOS & COVERING CO., OF PITTSBURG, PENNSYLVANIA, A CORPORATION OF PENNSYLVANIA.

PIPE-COVERING AND PROCESS OF MAKING SAME.

SPECIFICATION forming part of Letters Patent No. 775,537, dated November 22, 1904.

Application filed August 4, 1900. Serial No. 25,907. (No model.)

*To all whom it may concern:*

Be it known that I, JOHN A. MCCONNELL, a resident of Allegheny, in the county of Allegheny and State of Pennsylvania, have invented a new and useful Improvement in Pipe-Covering and Process of Making Same; and I do hereby declare the following to be a full, clear, and exact description thereof.

My invention relates to non-conducting coverings for steam-pipes, refrigerator-pipes, boilers, &c., constructed of several independent layers of paper, felt, asbestos, or other suitable non-conducting material.

It also consists in a rapid and continuous process of manufacturing the same.

In the manufacture of tubular non-conducting coverings of this character it is the custom to wrap the paper, felt, or other fibrous sheets around a mandrel until the desired thickness is built up, when it is removed from the mandrel and cut open longitudinally to permit its being placed upon the pipe or other body upon which it is to be used. It has been the custom to make such coverings in sections about three feet long, and it will be apparent that stopping and starting the various wrapping operations upon the mandrel and removing the mandrel to take off each section of tubular covering and then cutting the section open is a slow process, so that with the most improved machines heretofore in use it has been possible for two persons operating such a machine to make not more than one thousand feet per day of covering for small-sized pipes and a very much less quantity of covering of larger sizes. Furthermore, the longitudinal joint in the covering when made by the old process runs directly from the exterior to the interior thereof, thereby forming a short and straight passage for the escape of heat or the admission of cold. When these coverings are made as above stated—that is, by wrapping the layers around a mandrel and cementing them together—it is difficult by reason of the stiffness of the finished tube to open the same to place it about the pipe or other body. Hence it is the custom to cut the tubular sections into halves longitudinally, thus making two longitudinal joints for the escape of heat and destroying the natural elasticity or recoil of the material and making the coverings entirely dependent upon external bindings to hold them in place around the pipe.

It is the object of my invention to provide a practically-continuous process of making such coverings, by means of which almost an unlimited quantity of covering can be made in a day and whereby it is possible to form such coverings with longitudinal joints which are either overlapping or interlocking, U, V, or L shaped, or circuitous, whereby an out-of-line joint is provided which prevents the escape of heat from the pipe or other body covered thereby. By this process the tubular sections are provided with only a single longitudinal joint, thereby retaining the natural elasticity or recoil of the materials, which may be further increased by wetting the sections and holding them in shape until dry. At the same time the layers composing the covering are so united that it permits said layers to move upon each other, thereby making it easy to open up the section to place it about the pipe without the necessity of cutting said section into halves.

To this end my invention consists, generally stated, in taking strips of paper, felt, asbestos, or other fibrous sheets or any suitable material whatever and laying said strips one upon the other until the desired thickness of covering is secured and then forming the same into a tube or other suitable shape having a longitudinal joint. These strips may all be of the same width, or they may be of varying widths, as desired. They may be all laid up in line with each other or out of line with each other, according to the form of covering desired, and are then suitably secured together and drawn through forming bells, rings, or rolls, whereby the assembled strips are given the proper form, after which they are cut into sections of suitable length. As a consequence my process is a practically continuous and uninterrupted one, thereby greatly increasing the output of the apparatus and at the same time making it easy to make a pipe-covering having an out-of-line joint.

My improved process further consists in suitably dampening the covering after it is formed and then holding it in such formed condition until it is dry, whereby the same is given a permanent set and its recoil strength greatly increased.

To enable others skilled in the art to practice my invention, I will describe the same more fully, referring to the accompanying drawings, in which—

Figure 11:
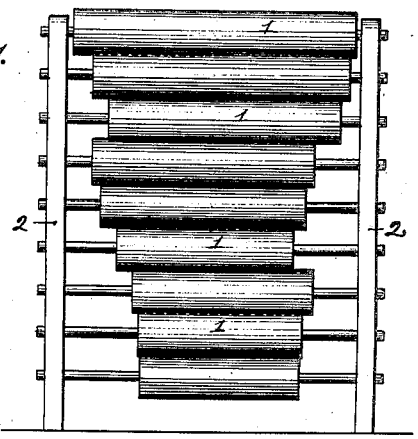
Figure 12:
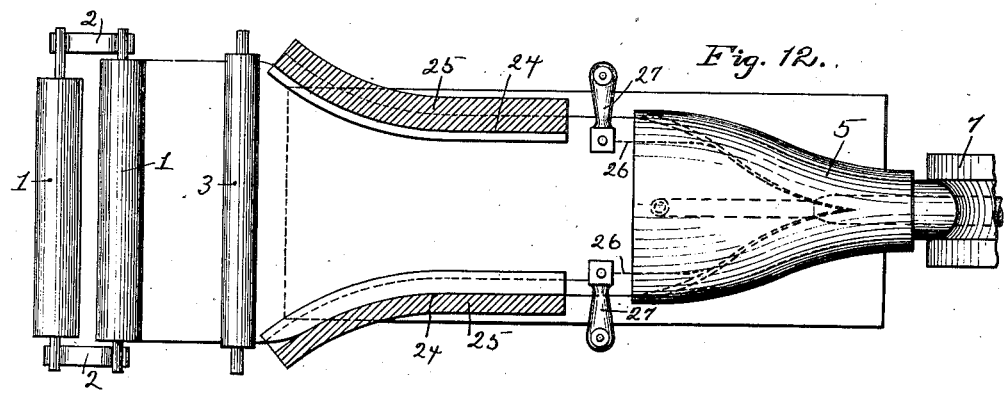
Figure 15:
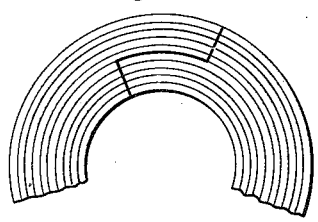
Figure 13:
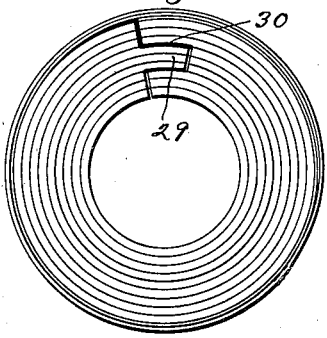
Figure 14:
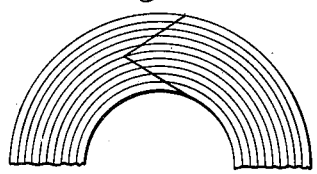

Figure 1 is a side view, partly in section, of an apparatus suitable for carrying out my improved process. Fig. 2 is a plan view of the same, partly in section. Fig. 3 is a cross-section of the same on the line 3 3, Fig. 2. Fig. 4 is an end view of the covering formed thereby. Fig. 5 is a sectional view on the line 5 5, Fig. 4. Fig. 6 is an enlarged section showing the manner in which the strips of material are arranged. Fig. 7 is a side view showing one manner of dampening the paper. Fig. 8 is a side view of a modified form of mandrel and the bell in section. Fig. 9 is a cross-section through the mandrel and an end view of the bell. Fig. 10 is a cross-section of an apparatus for making a modified form of tubular covering. Fig. 11 is a front view of the frame carrying the rolls to illustrate the manner of arranging the same. Fig. 12 is a plan view, partially in section, of the essential parts of the apparatus for making this form of covering. Fig. 13 is an end view of the covering made according to this modified process. Figs. 14 and 15 are similar views of modifications thereof. Fig. 16 is a cross-section showing the arrangement for making a third form of covering. Fig. 17 is a front view of the stand carrying the rolls for this form of covering. Fig. 18 is an end view of the covering made by this modified process. Fig. 19 is a cross-section illustrating the arrangement for making still another form of covering. Fig. 20 is a front view of the stand carrying the rolls for making this form of covering. Fig. 21 is a perspective view of the resultant covering. Figs. 22 and 23 are sectional views of modifications thereof, and Fig. 24 is an end view of a modified form of mandrel.

The strips of paper, felt, asbestos, or similar material are preferably wound upon a series of rollers 1 1, which are placed in suitable bearings on the stand 2, from which the strips of paper are drawn through suitable guide-rollers 3 3 and laid upon a table 4, from which they pass to the forming die or bell 5, provided with a suitable mandrel 6, by means of which they are coiled into tubular form, and thence pass between suitable grooved rolls 7 7 for completing the formation thereof, from which they pass upon suitable rollers 8 8, mounted in the table 9 and which may be power-driven, if desired. The continuous tube is then cut into suitable lengths by means of the saw 10, after which the sections are conveyed away.

In the modification illustrated on the first two sheets of drawings the strips on the rollers 1 are of varying widths, and the rollers 1, upon which said strips are wound, are placed in the stand 2 in such manner that said strips when drawn from the rollers are laid one upon the other out of line, as illustrated in detail in Fig. 6. The inner and outer strips are shown in Fig. 6 as of sufficient width to completely envelop all the intermediate layers, and the inner strip is creased at one or more points, so that when the assembled strips are coiled into tubular form the inner strip will have one or more plaits or laps folding together to allow this inner sheet to conform to the smaller diameter of the tube on its inner surface. This creasing of the strip is performed by suitable rollers 11 11, as shown in Figs. 1 and 2. After being laid upon the table 4 the strips are suitably secured together—as, for instance, by having a line of stitching 12 at or near the middle thereof and similar lines of stitching 13 13 uniting the edges of the enveloping strips. These lines of stitching are put in place by suitable sewing-machines or other mechanism, (diagrammatically shown at 14 14.) Instead of stitching the strips together they may be otherwise suitably secured—as, for instance, by stapling or even by pasting. The strips thus secured together are drawn into the forming bell or die 5, which may be of the flaring open type, as shown, or funnel-shaped, and are coiled about the mandrel 6, said mandrel being shown as of what is known as the "round" or "ball" type, and is held in place by the bent arm 15, suitably secured to the ceiling or any other convenient place. This mandrel extends forward through the bell or die 5, and the end thereof lies between the bite of the grooved rollers 7 7, so that said rollers firmly compact and shape the tubular covering about said mandrel. To reduce the friction at this point, a pair of elliptical or barrel-shaped rollers 16 are mounted in the end of the mandrel, said cones or rollers being mounted to revolve freely and bear against the interior of the tube. For large-diameter tubular sections I may use three or four of these revolving ellipses to form the circumference of the mandrel, as shown in Fig. 24. As soon as the formed tube emerges from the rollers 7 7 I bind strips or bands of cloth 17, preferably cotton tapes, at suitable intervals around the sections of covering, said strips being suitably gummed or provided with adhesive material, whereby they will be permanently secured to the tube. These tapes being applied at suitable intervals on each section make temporary ties, so that they hold the formed tube in shape until the latter becomes thoroughly set, and when the covering is applied to the steam-pipe or other body these tapes or bands are used as permanent ties to secure the same in place. As they do not rust and are not attacked by insects, they provide a strong and permanent fastening for the covering on the pipe or other body, so that the covering is not liable to fall off or have its joints sprung open to allow the escape of heat. The saw 10 is mounted in a depending arm 18, said arm being suitably pivoted at its upper end, so that the saw can be swung toward and away from the pipe-covering, and the arm is preferably so mounted that the saw may travel along with and at the same rate as the pipe-covering, so that said pipe-covering may be cut into sections without stopping the machine, and the cut will be perfectly square across the covering.

The strips of paper when made of different widths and laid one upon the other out of line, as shown in Fig. 6, with the narrower strips toward the side which forms the interior of the pipe, and then coiled into tubular form result in a covering, such as shown in Figs. 4 and 5, wherein the joint overlaps, thereby forming a long curved passage through which very little or none of the heat can escape. Furthermore, all of the strips are firmly secured together by the central line of stitching 12, and the enveloping strips have their edges secured together, thereby inclosing the intermediate strips and giving a finished edge to the covering, while at the same time the intermediate strips are unattached to each other except by the central line of stitching 12 and are therefore perfectly free to move upon each other at each side of this line of stitching, so that the resultant article is exceedingly flexible and easy to apply to the pipe or other body, while at the same time the set is sufficient to insure said covering springing around and firmly enveloping the pipe or other body. In Fig. 5 the layers are alternate plain and corrugated sheets, the corrugations extending circumferentially of the tube.

In order to insure a permanent set to the pipe or tube, it is desirable to dampen the same after it is formed and then allow the same to dry while held in such position. This dampening may be done in various ways—as, for instance, by introducing the sections of pipe after they leave the saw 10 into a closed chamber filled with steam or immersing the said sections in water. I prefer, however, to wet two or more of the strips before they are laid together. This may best be accomplished by conducting said strips through suitable water-troughs 21, as shown in Fig. 7, after which said strips are laid together with the dry strips, and said strips are then secured together and drawn through the bell and rolls, as before described. The wet strips soon communicate their moisture to the entire body of dry strips, and the pipe-covering after being formed is held in shape until thoroughly dry by means of the tapes 17, as before described. Whichever mode of dampening is used the sections of pipe are allowed to dry while being held by the tapes 17, so that after being dried they have a permanent set or form which insures their springing around and firmly enveloping the steam-pipe or other body. As is well known, paper, felt, asbestos, or similar fibrous material is very weak while damp. As a consequence by merely dampening a few of the strips and then forming the same or by forming the same while all of the strips are dry it is possible to work the process much more rapidly and satisfactorily than could be done if all of the strips were damp, while at the same time the drying of the formed tube while held in shape insures a permanent set to the same.

In Figs. 8 and 9 I have shown a modified form of mandrel consisting of a rod 22, having the convoluted member 23 secured thereto, and by drawing the strips of paper through the convolutions of said mandrel they will be formed into a tube of convoluted form or one having more than a single wrap.

When making tubular covering having an interlocking tongue and groove, V-shaped, L-shaped, or similar joint, such as shown in Figs. 13, 14, and 15, the strips of paper of different widths are placed upon rollers 1 1 and arranged in the stand in the manner illustrated in Fig. 11, from which rollers the sheets are drawn between the guide-rollers 3 upon the table 4 and the edges thereof drawn along in grooves 24, formed on the inner face of the curved guides 25, secured to the table. The grooves 24 are so formed that a portion of said strips or layers are displaced sidewise with reference to the others, so that a tongue is formed on one edge of the strip and a corresponding groove on the opposite edge or any other suitable form given to the edges thereof. The curved guides 25 are such a distance apart at their inner ends that the narrower strips or those forming the inner surface of the tube lie practically flat, while the remaining strips are bent upward, as shown in Fig. 10, the degree of curvature depending upon the width of the strip, and therefore gradually increasing toward the outer side of the tube. As said strips emerge from the guides 25, and while still held in this curved position, the edges thereof are stitched or stapled together, as at 26, by suitable stitching mechanism 27, and said assembled strips are then drawn through the bell 5 and about a suitable mandrel, after which they pass to the rollers 7 7 and are otherwise treated precisely as in the preceding form. The layers or strips in this form of covering being only fastened together near each edge permit the covering to easily spring open in order that it may be placed around the pipe, and therefore does away with the necessity of cutting the sections into two halves longitudinally, as has heretofore been the case and also in case the covering is made of fluted paper, permitting the circumferential grooves to form unbroken inclosed dead-air spaces. One or more of the strips may be dampened before being drawn upon the table 4, or the sections of tubing may be dampened and thereafter dried in the manner heretofore described. In the form of covering illustrated at Fig. 13 the three middle layers or strips are displaced sidewise, so that a tongue 29 is formed on one edge thereof and a corresponding groove 30 on the opposite edge thereof, whereby an interlocking joint is formed. In Fig. 14 this joint is shown as of V form and in Fig. 15 is of L form. It might likewise be of U, W, or other suitable form; but in any event an interlocking out-of-line joint results.

In the modification shown in Figs. 16 to 18, the strips, with the exception of the outer and inner, are all of the same width and are laid one upon the other in the same line. The inner and outer strips are shown as of sufficient width to envelop the intermediate layers and have their edges secured together by the stitching mechanism 31, as shown. The assembled strips are then stitched longitudinally near their center and drawn through a suitable bell or ring and shaping-rollers and formed into a tube and cut into sections in the same manner as described in connection with the preferred modification and may be dampened in precisely the same way and thereafter dried to give the sections a permanent set. The said strips when arranged in the manner shown and coiled into a tube form a beveled or feathered edge, as shown in Fig. 18. This modification is specifically claimed in a divisional application filed October 9, 1901, Serial No. 78,063.

In Figs. 19 to 23 is illustrated another modification, wherein all the strips are of the same width and are laid one upon the other out of line and then suitably secured together, as by stitching along the two edges, and are thereafter cut into sections. The resultant product is a stave or block such as shown at Figs. 21 and 22, having a tongue 32 on one edge and a corresponding groove 33 on the opposite edge. These staves or blocks may be slightly curved, as shown in Figs. 22 and 23, and are used for covering boilers and other large bodies, the curvature of the stave or block being such as to conform to the shape and size of the boiler. Instead of having tongue-and-groove joints, such as shown in Figs. 21 and 22, one of the edges of said stave or block may be formed concave, as shown at 34, and the other one formed convex, as shown at 35, thereby forming practically interlocking joints. These staves or blocks are preferably formed of alternate layers of flat and corrugated paper, as illustrated, and corrugated or fluted paper may be used in any of the other forms of covering shown, in which the grooves or corrugations would be made to run circumferentially and not longitudinally, so that the ends of said grooves or corrugations would abut against each other at the joint, thereby forming practically closed air-spaces and preventing the escape of heat or the admission of cold, as would be liable to occur if said grooves ran longitudinally of the covering and opened out at the ends of the section. By having a single longitudinal joint, and this an overlapping or interlocking one, the escape of air in the transverse grooves is practically prevented, while the layers being free to move upon each other permit the covering to be placed on the pipe without cutting the same into two halves, as heretofore done in coverings having flutings running circumferentially of the covering.

What I claim, and desire to secure by Letters Patent, is—

1. The method of making non-conducting coverings, consisting in laying strips of fibrous or similar material one on the other until the desired thickness of covering is obtained, drawing said assembled strips longitudinally and progressively bending the same into a tube, and then attaching cloth bands thereto and securing the same to hold the tube in form.

2. The method of making non-conducting coverings, consisting in laying strips of fibrous or similar material out of line with each other, and one on the other, until the desired thickness of covering is obtained, securing said strips together along a longitudinal line, and then drawing said assembled strips longitudinally and progressively bending the same into suitable form to serve as non-conducting coverings.

3. The method of making non-conducting coverings, consisting in laying strips of fibrous or similar material out of line with each other, and one on the other, until the desired thickness of covering is obtained, securing said strips together along a longitudinal line, drawing said assembled strips longitudinally and progressively bending the same into suitable form to serve as non-conducting coverings, and then cutting said formed strips into sections.

4. The method of making non-conducting coverings, consisting in laying strips of fibrous or similar material out of line with each other, and one on the other, until the desired thickness of covering is obtained, uniting said strips by stitching longitudinally, and then drawing said assembled strips longitudinally and progressively bending the same into a tube having a longitudinal joint.

5. The method of making non-conducting coverings, consisting in laying strips of fibrous or similar material out of line with each other, and one on the other, until the desired thickness of covering is obtained, uniting said strips by stitching the same together along the longitudinal center thereof, and then drawing said assembled strips longitudinally and progressively bending the same into a tube having a longitudinal out-of-line joint.

6. The method of making non-conducting coverings, consisting in laying strips of fibrous or similar material out of line with each other, and one on the other, until the desired thickness of covering is obtained, stitching said strips longitudinally, and then bending said assembled strips into a tube having a longitudinal out-of-line joint.

7. The method of making non-conducting coverings, consisting in laying strips of fibrous or similar material out of line with each other, and one on the other, until the desired thickness of covering is obtained, uniting said strips by stitching the same longitudinally, drawing said assembled strips longitudinally and progressively bending the same into a tube having a longitudinal joint, and then cutting the tube into sections.

8. The method of making non-conducting coverings, consisting in laying strips of fibrous or similar material out of line with each other, and one on the other, until the desired thickness of covering is obtained, bending said assembled strips into a tube having a longitudinal joint, and attaching cloth bands thereto and securing the same to hold the tube in form and to hold it on the pipe when applied.

9. The method of making non-conducting coverings, consisting in taking strips of fibrous or similar material of different widths, laying such strips one on the other until the desired thickness of covering is obtained, and then bending said assembled strips into a tube.

10. The method of making non-conducting coverings, consisting in taking strips of fibrous or similar material of different widths, laying said strips one on the other until the desired thickness of covering is obtained, suitably uniting said strips and then bending said assembled strips into a tube having a longitudinal, out-of-line joint.

11. The method of making non-conducting coverings, consisting in taking strips of fibrous or similar material of different widths, laying said strips one on the other until the desired thickness of covering is obtained, bending said assembled strips into a tube having a longitudinal joint, and then cutting the tube into sections.

12. The method of making non-conducting coverings consisting in taking strips of fibrous or similar material of different widths, laying said strips one on the other until the desired thickness of covering is obtained, bending said assembled strips into a tube, and attaching cloth bands thereto and securing the same to hold the tube in form, and to hold it upon the pipe when applied.

13. The method of making non-conducting coverings, consisting in taking strips of fibrous or similar material of different widths, laying said strips out of line with each other, and one on the other, until the desired thickness of covering is obtained, and then bending said assembled strips into a tube.

14. The method of making non-conducting coverings, consisting in taking strips of fibrous or similar material of different widths, laying said strips out of line with each other, and one on the other, until the desired thickness of covering is obtained, suitably uniting said strips, and then bending said assembled strips into a tube having a longitudinal, out-of-line joint.

15. The method of making non-conducting coverings, consisting in taking strips of fibrous or similar material of different widths, laying said strips out of line with each other, and one on the other, until the desired thickness of covering is obtained, stitching said strips longitudinally, and then bending said assembled strips into a tube having a longitudinal out-of-line joint.

16. The method of making non-conducting coverings, consisting in taking strips of fibrous or similar material of different widths, laying said strips out of line with each other, and one on the other, until the desired thickness of covering is obtained, bending said assembled strips into a tube having a longitudinal joint, and then cutting said tube into sections.

17. The method of making non-conducting coverings, consisting in laying strips of fibrous or similar material one on the other until the desired thickness of covering is obtained, the strips forming the inner and outer layers overlapping the intermediate layers, suitably uniting the edges of said inner and outer layers, and then bending said assembled strips into suitable form to serve as pipe-covering.

18. The method of making non-conducting coverings, consisting in laying strips of fibrous or similar material one on the other until the desired thickness is obtained, the strips forming the inner and outer layers overlapping the intermediate layers, suitably uniting all the layers longitudinally and the edges of said inner and outer layers, and then bending said assembled strips into suitable form to serve as pipe-covering.

19. The method of making non-conducting coverings, consisting in laying strips of fibrous or similar material one on the other until the desired thickness of covering is obtained, the strips forming the inner and outer layers overlapping the other layers, suitably uniting the edges of said inner and outer layers, bending said assembled strips into suitable form to serve as pipe-covering, and then cutting the formed strips into sections.

20. The method of making non-conducting coverings, consisting in laying strips of fibrous or similar material out of line and one on the other until the desired thickness of covering is obtained, the strips forming the inner and outer layers overlapping the intermediate layers, suitably uniting the edges of the inner and outer layers, and then bending said assembled strips into a tube.

21. The method of making non-conducting coverings, consisting in taking strips of fibrous or similar material of different widths, laying said strips one on the other until the desired thickness of covering is obtained, uniting a plurality of said strips at their edges, and then bending said assembled strips into a tube having a longitudinal joint.

22. The method of making non-conducting coverings, consisting in taking strips of fibrous or similar material of different widths, laying said strips one on the other until the desired thickness is obtained, the strips forming the inner and outer layers overlapping the intermediate layers, suitably uniting the edges of said inner and outer layers, and then bending the assembled strips into a tube.

23. The method of making non-conducting coverings, consisting in taking strips of fibrous or similar material of different widths, laying said strips one on the other until the desired thickness of covering is obtained, the strips forming the inner and outer layers being wider than the intermediate strips, suitably uniting said inner and outer layers at their edges and the assembled strips at or near their middle, and then bending the assembled strips into a tube.

24. The method of making non-conducting coverings, consisting in laying strips of fibrous or similar material one on the other until the desired thickness of covering is obtained, the inner and outer layers being wider than the intermediate layers, and the inner layer being suitably creased to form a fold or plait, suitably uniting the edges of said inner and outer layers, and then bending the assembled strips into a tube.

25. The method of making non-conducting coverings, consisting in laying strips of fibrous or similar material, one on the other until the desired thickness of covering is obtained, the inner and outer layers being wider than the intermediate layers, the inner layer being suitably creased to form a plait, suitably uniting the edges of the inner and outer layers and all the layers longitudinally near their middle, and then bending the assembled strips into a tube.

26. The method of making non-conducting coverings and similar articles, which consists in taking paper or similar fibrous material, bending the same into the desired form, dampening the same, and then holding the same in form until dry to impart a permanent set thereto.

27. The method of making non-conducting coverings and similar articles, which consists in taking paper or similar fibrous material, bending the same into tubular form, dampening the same, and then holding the same in tubular form until dry to impart a permanent set thereto.

28. The method of making non-conducting coverings, consisting in laying strips of fibrous or similar material one on the other until the desired thickness of covering is obtained, bending said assembled strips in suitable form to serve as pipe-coverings, dampening the same and then holding in form until dry to impart a permanent set thereto.

29. The method of making non-conducting coverings, consisting in laying strips of fibrous or similar material one on the other until the desired thickness of covering is obtained, bending said assembled strips into tubular form, dampening the same, and then attaching cloth bands thereto and temporarily securing the same to hold the tube in form until dry.

30. The method of making non-conducting coverings, consisting in laying strips of fibrous or similar material one on the other until the desired thickness of covering is obtained, one or more of said strips being moist, bending said assembled strips into suitable form to serve as pipe-coverings, and then holding the same in form until the dampness spreads through the whole body and then continuing to hold in form until dry, to impart a permanent set to the covering.

31. The method of making non-conducting coverings, consisting in laying strips of fibrous or similar material one on the other until the desired thickness of covering is obtained, one or more of said strips being moist, bending said assembled strips into tubular form, and then attaching cloth bands thereto and temporarily securing the same to hold the tube in form until dry.

32. A tubular, non-conducting covering, built up of several independent layers of fibrous or similar material suitably secured together, said layers being of different widths, and having a longitudinal, out-of-line joint.

33. A tubular, non-conducting covering, built up of several independent layers of fibrous or similar material laid one on the other, the inner and outer layers forming an envelop for the intermediate layers, said tube having a longitudinal, out-of-line joint.

34. A tubular, non-conducting covering, consisting of several independent layers of fibrous or similar material, of different widths, the inner and outer layers forming an envelop for the intermediate layers, and all of said layers being united near their middle, thereby forming a tube having a longitudinal, out-of-line joint.

35. A tubular, non-conducting covering, consisting of several independent layers of fibrous or similar material of different widths, the inner and outer layers having their edges united to each other and forming an envelop for the intermediate layers, all of said layers forming a tube having a longitudinal, out-of-line joint.

36. A tubular non-conducting covering, consisting of several independent layers of fibrous or similar material suitably secured together and of tubular form having a longitudinal joint, and cloth bands permanently attached to said tube and serving to hold the same in form or to bind the same in place on the pipe or other body.

37. A tubular, non-conducting covering, consisting of a fibrous or similar material formed into a tube having a longitudinal joint, and cloth bands permanently attached to said tube and serving to hold the same in form or to bind the same in place on the pipe or other body.

38. A tubular, non-conducting covering, consisting of several independent layers of fibrous or similar material suitably secured together and having only one longitudinal joint, alternate layers being corrugated transversely thereby forming practically closed circumferential air-spaces.

In testimony whereof I, the said JOHN A. McCONNELL, have hereunto set my hand.

JOHN A. McCONNELL.

Witnesses:
F. W. WINTER,
ROBERT C. TOTTEN.